United States Patent
Blankenship et al.

(10) Patent No.: US 10,932,205 B2
(45) Date of Patent: Feb. 23, 2021

(54) UPLINK POWER SHARING CONTROL

(71) Applicant: BLACKBERRY LIMITED, Waterloo (CA)

(72) Inventors: Yufei Wu Blankenship, Kildeer, IL (US); Shiwei Gao, Nepean (CA); Hua Xu, Ottawa (CA)

(73) Assignee: BLACKBERRY LIMITED, Waterloo (CA)

( * ) Notice: Subject to any disclaimer, the term of this patent is extended or adjusted under 35 U.S.C. 154(b) by 944 days.

(21) Appl. No.: 13/957,620

(22) Filed: Aug. 2, 2013

(65) Prior Publication Data

US 2015/0036566 A1 Feb. 5, 2015

(51) Int. Cl.
| | |
|---|---|
| *H04W 52/28* | (2009.01) |
| *H04W 52/38* | (2009.01) |
| *H04W 52/36* | (2009.01) |
| *H04W 72/04* | (2009.01) |
| *H04W 52/14* | (2009.01) |

(52) U.S. Cl.
CPC ....... *H04W 52/281* (2013.01); *H04W 52/367* (2013.01); *H04W 72/0413* (2013.01); *H04W 52/146* (2013.01); *H04W 52/38* (2013.01)

(58) Field of Classification Search
None
See application file for complete search history.

(56) References Cited

U.S. PATENT DOCUMENTS

| | | | |
|---|---|---|---|
| 8,155,023 B2 * | 4/2012 | Vedantham et al. | 370/252 |
| 8,593,979 B2 * | 11/2013 | Kim | H04W 52/281 370/241 |
| 2004/0203980 A1 * | 10/2004 | Das et al. | 455/522 |
| 2007/0004437 A1 * | 1/2007 | Harada et al. | 455/506 |
| 2008/0267146 A1 | 10/2008 | Lewis | |
| 2010/0182950 A1 | 7/2010 | Sexton | |
| 2011/0249578 A1 * | 10/2011 | Nayeb Nazar et al. | 370/252 |
| 2011/0275403 A1 | 11/2011 | Chen | |
| 2012/0002564 A1 | 1/2012 | Sexton | |
| 2012/0057547 A1 * | 3/2012 | Lohr | H04L 5/0007 370/329 |
| 2012/0120817 A1 * | 5/2012 | Khoshnevis et al. | 370/252 |

(Continued)

FOREIGN PATENT DOCUMENTS

| | | |
|---|---|---|
| EP | 2378819 A2 | 10/2011 |
| WO | 2013025562 | 2/2013 |

(Continued)

OTHER PUBLICATIONS

3GPP TS 33.401 V8.4.0, Technical Specification, 3rd Generation Partnership Project; Technical Specification Group Services and System Aspects; 3GPP System Architecture Evolution (SAE): Security architecture; (Release 8), Jun. 2009 (95 pages).

(Continued)

*Primary Examiner* — James P Duffy

(74) *Attorney, Agent, or Firm* — Trop, Pruner & Hu, P.C.

(57) ABSTRACT

A user equipment detects that an aggregate of calculated uplink transmit power of the UE exceeds a threshold. In response to the detecting, a power of at least one of a plurality of frequency-division multiplexing (FDM)-based uplink transmissions of the UE over corresponding wireless connections with respective wireless access network nodes is adjusted.

14 Claims, 5 Drawing Sheets

(56) References Cited

U.S. PATENT DOCUMENTS

| | | | |
|---|---|---|---|
| 2012/0176967 A1* | 7/2012 | Kim et al. | 370/328 |
| 2012/0269072 A1* | 10/2012 | Wu | H04W 52/383 |
| | | | 370/242 |
| 2012/0287853 A1* | 11/2012 | Liu et al. | 370/328 |
| 2013/0188580 A1* | 7/2013 | Dinan | 370/329 |
| 2014/0010207 A1* | 1/2014 | Horn | H04W 36/165 |
| | | | 370/332 |
| 2014/0204771 A1 | 7/2014 | Gao | |
| 2014/0254476 A1 | 9/2014 | Blankenship | |
| 2014/0269632 A1 | 9/2014 | Blankenship | |
| 2014/0328182 A1 | 11/2014 | Gao | |
| 2015/0230236 A1* | 8/2015 | Zeng | H04L 41/0806 |
| | | | 370/329 |

FOREIGN PATENT DOCUMENTS

| | | |
|---|---|---|
| WO | 2013/067430 A1 | 5/2013 |
| WO | 2013/100541 A1 | 7/2013 |

OTHER PUBLICATIONS

3GPP TR 33.821 V8.0.0, Technical Report, 3rd Generation Partnership Project; Technical Specification Group Services and System Aspects; Rationale and track of security decisions in Long Term Evolved (LTE) RAN / 3GPP System Architecture Evolution (SAE) (Release 8), Mar. 2009 (137 pages).

3GPP TS 36.300 V11.6.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Jun. 2013 (209 pages).

3GPP TS 36.331 V11.4.0, Technical Specification, 3rd Generation Partnership Project; Technical Specification Group Radio Access Network; Evolved Universal Terrestrial Radio Access (E-UTRA); Radio Resource Control (RRC); Protocol specification (Release 11), Jun. 2013 (346 pages).

3GPP TS 36.413 V11.1.0, Technical Specification, 3rd Generation Partnership Project; Technical Specification Group Radio Access Network; Evolved Universal Terrestrial Radio Access Network (E-UTRAN); S1 Application Protocol (S1AP) (Release 11), Sep. 2012 (262 pages).

3GPP TS 36.423 V11.2.0, Technical Specification, 3rd Generation Partnership Project; Technical Specification Group Radio Access Network; Evolved Universal Terrestrial Radio Access Network (E-UTRAN); X2 application protocol (X2AP) (Release 11), Sep. 2012 (136 pages).

3GPP TR 36.806 V9.0.0, Technical Report, 3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010 (34 pages).

3GPP TR 36.839 V11.1.0, Technical Report, 3rd Generation Partnership Project; Technical Specification Group Radio Access Network; Evolved Universal Terrestrial Radio Access (E-UTRA); Mobility enhancements in heterogeneous networks (Release 11), Dec. 2012 (53 pages).

3GPP TR 36.912 V11.0.0, Technical Report, 3rd Generation Partnership Project; Technical Specification Group Radio Access Network; Feasibility study for Further Advancements for E-UTRA (LTE-Advanced) (Release 11), Sep. 2012 (62 pages).

Han et al., Capacity Analysis of Generalized Distributed Wireless Communication System and Transmit Antenna Selection for Maximization of Average Capacity, IEEE 2004 (5 pages).

Shan-Yuan Ho, Data Fusion in a Relay Network, SIT 2008, Toronto, Canada, Jul. 6-11, 2008 (5 pages).

Vasken Genc et al., IEEE 802.16J Relay-Based Wireless Access Networks: An Overview, Oct. 2008 (8 pages).

Kerpez et al., IEEE Transactions on Vehicular Technology, vol. 45, No. 2, 265—A Radio Access System with Distributed Antennas, May 1996 (11 pages).

David Soldani et al., Radio Communications Series, Nokia Siemens Networks, Wireless Relays for Broadband Access, Mar. 2008 (9 pages).

[Draft] 3GPP TR 36.392 V0.1.0 Technical Report 3rd Generation Partnership Project; Technical Specification Group Radio Access Network; Scenarios and Requirements for Small Cell Enhancement for E-UTRA and E-UTRAN; (Release 12) (Oct. 2012) (12 pages).

3GPP TS 25.214 V11.6.0 Technical Specification 3rd Generation Partnership Project; Technical Specification Group Radio Access Network; Physical layer procedures (FDD) (Release 11) (Jun. 2013) (128 pages).

Yajun Zhu et al., U.S. Appl. No. 14/002,371 entitled Transmitting a Synchronization Indication filed Aug. 30, 2013 (47 pages).

3GPP TS 36.101 V11.5.0 Technical Specification 3rd Generation Partnership Project; Technical Specification Group Radio Access Network; Evolved Universal Terrestrial Radio Access (E-UTRA); User Equipment (UE) radio transmission and reception (Release 11) Jul. 2013 (446 pages).

3GPP TS 36.213 V11.3.0 Technical Specification 3rd Generation Partnership Project; Technical Specification Group Radio Access Network; Evolved Universal Terrestrial Radio Access (E-UTRA); Physical layer procedures (Release 11) Jun. 2013 (176 pages).

European Patent Office, International Searching Authority, Invitation to Pay Additional Fees and, where applicable, Protest Fee and Communication to the Results of the Partial International Search dated Sep. 15, 2014 (11 pages).

3GPP TSG-RAN WG2 Meeting #82, Fukuoka, Japan, R2-131849, Agenda Item: 7.2.1, Source: Renesas Mobile Europe, Title: UL transmission of dual connectivity, Document for Discussion, May 20-May 24, 2013 (4 pages).

European Patent Office, PCT Notification of Transmittal of the International Search Report and the Written Opinion of the International Searching Authority, or the Declaration for PCT/US2014/047756 dated Jan. 12, 2015 (26 pages).

The International Bureau of WIPO, International Preliminary Report on Patentability for PCT/US2014/047756 dated Feb. 11, 2016 (18 pages).

European Patent Office, Communication pursuant to Article 94(3) EPC for European Appl. No. 14748440.6 dated Oct. 13, 2016 (6 pages).

European Patent Office, Partial European Search Report for Appl. No. 17189269.8 dated Nov. 12, 2017 (28 pages).

European Patent Office, Extended European Search Report for Appl. No. 17189269.8 dated Mar. 29, 2018 (29 pages).

European Patent Office, Communication pursuant to Article 94(3) for Appl. No. 17189269.8 dated Oct. 22, 2020 (8 pages).

* cited by examiner

UPLINK POWER SHARING CONTROL

BACKGROUND

As the demand for wireless data communication using wireless user equipments (UEs) has increased, wireless access service providers are increasingly facing challenges in meeting capacity demands in regions where the density of users is relatively high. To address capacity issues, small cells have been developed. A small cell (or multiple small cells) can operate within a coverage area of a larger cell, referred to as a macro cell. A small cell has a coverage area that is smaller than the coverage area of the macro cell.

If small cells are deployed, then communications with UEs can be offloaded from the macro cell to the small cells. In this way, data communication capacity is increased to better meet data communication demands in regions of relatively high densities of UEs.

BRIEF DESCRIPTION OF THE DRAWINGS

Some embodiments are described with respect to the following figures.

DETAILED DESCRIPTION

Figure 1:
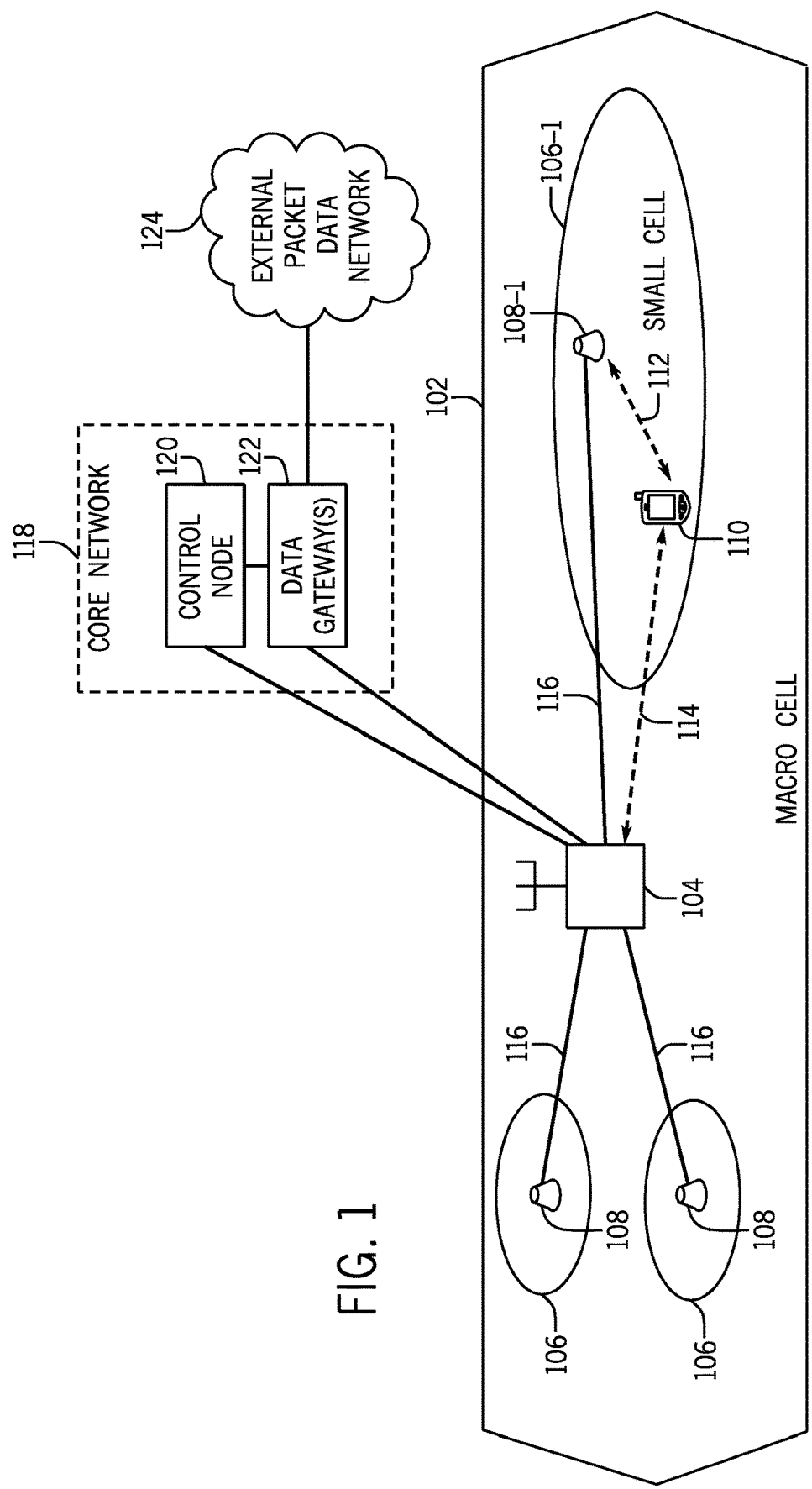
FIG. 1 is a schematic diagram of an example arrangement that includes macro cells and small cells, in accordance with some implementations.

FIG. 1 illustrates an example arrangement that includes network nodes that are part of a mobile communications network that supports wireless communications with user equipments (UEs). A node can refer to an electronic device that is capable of sending, receiving, and forwarding information over a communication channel, and of performing designated tasks. A macro cell 102 corresponds to a coverage area provided by a macro wireless access network node 104. A coverage area can refer to a region where mobile services can be provided by a network node to a target level. A wireless access network node is responsible for performing wireless transmissions and receptions with UEs. In addition, a number of small cells 106 are depicted as being within the coverage area of the macro cell 102. Each small cell 106 corresponds to a coverage area provided by a respective small cell wireless access network node 108. One of the small cells is labeled 106-1, and the corresponding small cell wireless access network node is labeled 108-1.

In the ensuing discussion, a small cell can refer to a cell whose coverage area is smaller than the coverage area provided by a larger cell, which is also referred to as a macro cell. In some examples, the frequency at which the macro wireless access network node 104 operates can be lower than that of a small cell wireless access network node 108. A lower frequency allows a greater geographic reach for wireless signals transmitted by the macro wireless access network node 104. On the other hand, at a higher frequency, wireless signals transmitted by the small cell wireless access nodes 108 propagate smaller distances. As a result, small cells 106 can be deployed in relatively close proximity to each other.

More generally, the macro cell 102 can use a frequency that is different from one or more frequencies of the small cells 106. At least some of the small cells 106 can use different frequencies.

A wireless user equipment (UE) 110 within the coverage area of the small cell 106-1 is able to wirelessly communicate with the small cell wireless access network node 108-1. The UE 110 is also able to wirelessly communicate with the macro wireless access network node 104. Examples of the UE 110 can include any of the following: a smart phone, a personal digital assistant, a notebook computer, a tablet computer, or any other device that is capable of wireless communications. Although just one UE 110 is depicted in FIG. 1, it is noted that multiple UEs may be present in coverage areas of each of the small cells 106 as well as within the coverage area of the macro cell 102.

Also, although reference is made to macro and small cell wireless access network nodes in the present discussion, it is noted that techniques or mechanisms according to some implementations can also be applied to other types of wireless access network nodes, such as in deployments without small cells.

A first wireless connection 112 can be established between the UE 110 and the small cell wireless access network node 108-1. In addition, a second wireless connection 114 can be established between the UE 110 and the macro wireless access network node 104. In such an arrangement, the UE 110 is considered to have established dual concurrent wireless connections with the macro wireless access network node 104 and the small cell wireless access network node 108-1. In other examples, the UE 110 can establish multiple concurrent wireless connections with the macro wireless access network node 104 and with multiple small cell wireless access network nodes 108.

FIG. 1 also shows a backhaul link 116 between the macro wireless access network node 104 and each of the small cell wireless access network nodes 108. The backhaul link 116 can represent a logical communication link between two nodes; the backhaul link 116 can either be a direct point-to-point link or can be routed through another communication network or node. In some examples, the backhaul link 116 is a wired link. In other examples, the backhaul link 116 is a wireless link.

In some implementations, the macro cell 102 (and more specifically the macro wireless access network node 104) can provide all of the control plane functions, while a small cell 106 (more specifically the corresponding small cell wireless access network node 108) provides at least a portion of the user plane functions for a dual-connection capable UE (a UE that is capable of concurrently connecting to both macro and small cells). Note that the macro wireless access network node 104 can also provide user plane functions for the dual-connection capable UE.

Control plane functions involve exchanging certain control signaling between the macro wireless access network node 104 and the UE 110 to perform specified control tasks, such as any or some combination of the following: network attachment of a UE, authentication of the UE, setting up radio bearers for the UE, mobility management to manage mobility of the UE (mobility management includes at least determining which infrastructure network nodes will create, maintain or drop uplink and downlink connections carrying control or user plane information as a UE moves about in a geographic area), performance of a handover decision based on neighbor cell measurements sent by the UE, transmission of a paging message to the UE, broadcasting of system information, control of UE measurement reporting, and so forth. Although examples of control tasks and control messages in a control plane are listed above, it is noted that in other examples, other types of control messages and control tasks can be provided. More generally, the control plane can perform call control and connection control functions, and can provide messaging for setting up calls or connections, supervising calls or connections, and releasing calls or connections.

User plane functions relate to communicating traffic data (e.g. voice data, user data, application data, etc.) between the UE and a wireless access network node. User plane functions can also include exchanging control messages between a wireless access network node and a UE associated with communicating the traffic data, flow control, error recovery, and so forth.

A small cell connection can be added to or removed from a UE under the control of the macro wireless access network node 104. In some implementations, the action of adding or removing a small cell for a UE can be transparent to a core network 118 of the mobile communications network. The core network 118 includes a control node 120 and one or more data gateways 122. The data gateway(s) 122 can be coupled to an external packet data network (PDN) 124, such as the Internet, a local area network (LAN), a wide area network (WAN), and so forth.

Note that a legacy UE (a UE that is not capable of establishing multiple concurrent wireless connections with both a macro cell and one or more small cells) can connect to either a macro cell or a small cell using traditional wireless connection techniques.

When a UE moves under the coverage of a small cell 106, the macro wireless access network node 104 may decide to offload some of the user plane traffic to the small cell. This offload is referred to as a data offload. When a data offload has been performed from the macro cell 104 to the small cell 106, then a UE that has a dual connection can transmit or receive data to and from the corresponding small cell wireless access network node 108. Additionally, the UE 110 can also communicate user plane traffic with the macro wireless access network node 104. Although reference is made to data offload to one small cell, it is noted that in other examples, the macro cell 104 can perform data offload for the UE 110 to multiple small cells.

In some examples, the data offload causes the offloaded data to be communicated between the macro wireless access network node 104 and the respective small cell wireless access network node 108 over the respective backhaul link 116. In this case, the data offload involves the macro cell 102, without involving the core network 118. In other words, the data offload is transparent to the core network 118.

In other examples, the data offload may be performed at the data gateway 122, such as a serving gateway (discussed further below). In this case, the serving gateway can send some of the UE's user plane traffic directly to the small cell wireless access network node 108 over a link between the small cell wireless access network node 108 and the data gateway 122, such as the S1-U link according to the Long-Term Evolution (LTE) standards. In this case, the data offload is visible to the core network 118.

As another example, the data gateway 122 can send data to the small cell wireless access network node 108 via the macro wireless access network node 104. In this case, the macro wireless access network node 104 acts as a router for forwarding data communicated between the data gateway 122 and the small cell wireless access network node 108.

A total uplink transmit power threshold can be specified for uplink transmissions of a UE to the network. In implementations where a UE has concurrent wireless connections with multiple wireless access network nodes (e.g. multiple concurrent connections with the macro wireless access network node 104 and one or more small cell wireless access network nodes 108), it may be possible for the uplink transmissions over the multiple wireless connections to cause power to exceed the total uplink transmit power threshold.

In accordance with some implementations, techniques or mechanisms are provided to allow for control of the power of uplink transmissions from a UE such that the total power of the uplink transmissions of the UE no longer exceeds the total uplink transmit power threshold. Such control can be referred to as uplink transmit power sharing control.

In scenarios where there are concurrent wireless connections with multiple wireless access network nodes, uplink transmit power sharing control can be complicated by the fact that one wireless access network node is not aware of control signals that have been scheduled by another wireless access network node for uplink transmission by a UE. This is especially true in deployments where the backhaul link (e.g. 116 in FIG. 1) between wireless access network nodes has a relatively high latency, which prevents the wireless access network nodes from informing each other in a timely manner of how the wireless access network nodes are interacting with UEs.

In an example, the UE (which has concurrent wireless connections with multiple wireless access network nodes) may drop transmission of a given uplink control signal to reduce uplink transmit power. However, a wireless access network node may not be able to determine whether an undetected uplink control signal within a given transmission time period was dropped by the UE as part of uplink transmit power sharing control, or was lost due to an uplink transmission error (because of poor wireless link conditions or for another reason). This is due to the fact that each of the multiple wireless access network nodes has a respective scheduler, such as a Medium Access Control (MAC) scheduler, for scheduling uplink control signals for transmission by the UE.

In contrast, in a traditional carrier aggregation scenario, just one wireless access network node would be involved; as a result, a scheduler, e.g. MAC scheduler, in the wireless access network node is able to determine what uplink control signals have been scheduled by the scheduler for uplink transmissions. In a single-wireless access network node carrier aggregation scenario, the wireless access network node is able to predict whether an undetected control signal was dropped due to uplink transmit power sharing control at a UE. Note that with carrier aggregation, the component carriers of the carrier aggregation share the same MAC layer and upper layers above the MAC layer in the wireless access network node. Different physical layers are provided for the different component carriers.

In accordance with some implementations, in arrangements where a UE has concurrent wireless connections with multiple wireless access network nodes, prioritization rules can be specified for uplink transmit power sharing control so that each eNB is able to determine what to expect from the UE on an uplink. Various prioritization rules are described further below. A prioritization rule can be pre-configured in the UE. Alternatively, a prioritization rule can be signaled by an eNB to the UE.

When receiving an uplink transmission from a UE, an eNB is able to process the received uplink transmission based on information relating to uplink transmit power sharing control at the UE. For example, the information relating to the uplink transmit power sharing control can be at least one prioritization rule used by the UE for adjusting one or more uplink transmissions when a power threshold is exceeded. In this way, the eNB is able to accurately detect the received uplink transmission. For example, the eNB would be able to determine when an uplink transmission's power has been lowered, or when an uplink transmission has been dropped.

Figure 2:
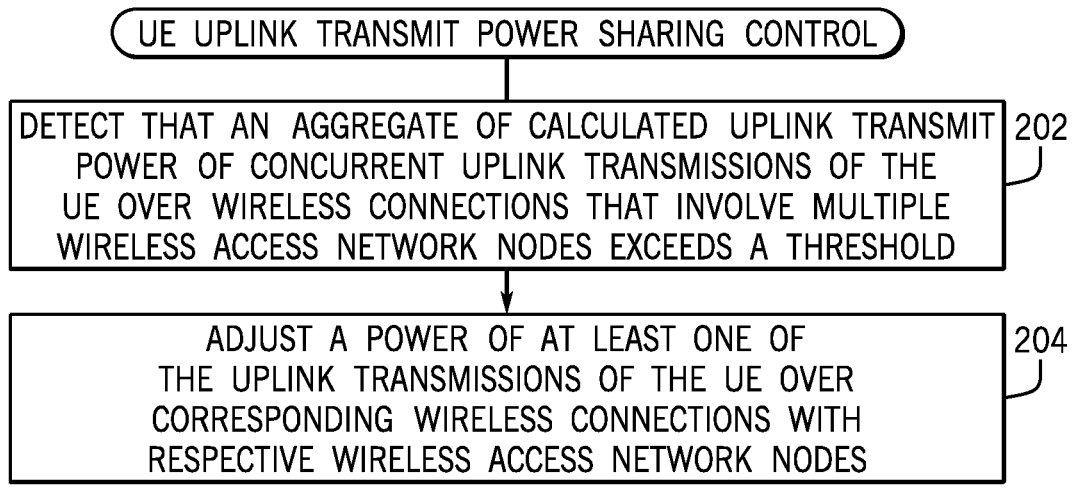
FIG. 2 is a flow diagram of an uplink transmit power sharing control process according to some implementations.

FIG. 2 illustrates an example uplink transmit power sharing control process that can be performed by a UE according to at least one prioritization rule. The UE detects (at 202) that an aggregate of calculated uplink transmit power (or total calculated uplink transmit power) of concurrent uplink transmissions of the UE over wireless connections (that involve multiple wireless access network nodes) exceeds a threshold. A UE is able to calculate uplink transmit power for each of the concurrent uplink transmissions. Concurrent uplink transmissions refer to uplink transmissions of the UE where at least some portion of the uplink transmissions overlap one another in time (in other words, the uplink transmissions can overlap partially or fully). Each of at least two of the wireless access network nodes includes a corresponding separate scheduler (e.g. MAC scheduler) for individually scheduling uplink transmissions of the UE.

In some implementations, the uplink transmissions are frequency-division-multiplexing (FDM)-based uplink transmissions. FDM is a technique by which a frequency bandwidth can be divided into non-overlapping frequency sub-bands, which can be used to carry uplink transmissions. Each uplink transmission may utilize one or more frequency sub-bands. Examples of FDM techniques include orthogonal FDM (OFDM) techniques, single-carrier frequency-division multiple access (SC-FDMA) techniques, and so forth. More generally, an FDM-based uplink transmission refers to an uplink transmission that is carried in a frequency portion(s). Furthermore, after two FDM-based uplink transmissions are constructed, they may be mapped to share the same carrier frequency, or mapped to different carrier frequencies.

In response to detecting that the aggregate of calculated uplink transmit power exceeds the threshold, the process of FIG. 2 adjusts (at 204) a power of at least one of the uplink transmissions of the UE over the corresponding wireless connections with respective wireless access network nodes. In some implementations, the adjusting is according to at least one prioritization rule specifying priorities of the uplink transmissions. The adjusting of power of at least one of the multiple uplink transmissions of the UE can include one or more of the following: (1) reducing the power (also referred to as "scaling down" or simply "scaling" of the power) of the at least one uplink transmission; or (2) dropping the at least one uplink transmission.

A UE can establish just one wireless connection with a wireless access network node, or multiple concurrent wireless connections with the wireless access network node. For example, the wireless access network node can provide carrier aggregation, which allows a UE to communicate with the wireless access network node using multiple component carriers (at respective different frequencies) provided by the wireless access network node. The component carriers are aggregated together to provide carrier aggregation. The UE can establish multiple concurrent wireless connections with the wireless access network node on the respective component carriers.

One or more cells can be provided on a given component carrier. In the context of carrier aggregation, a "cell" can refer generally to a coverage area provided by a wireless access network node on the respective component carrier. One of the component carriers is configured as a primary cell, or Pcell, while the remaining component carrier(s) is (are) configured as secondary cell(s), or Scell(s). The primary cell is used to communicate certain control information to UEs served by the primary cell.

If carrier aggregation is not performed, then each of multiple concurrent wireless connections of a UE is established with an individual corresponding wireless access network node. On the other hand, if at least one wireless access network node supports carrier aggregation, then a subset of the multiple concurrent wireless connections are established over component carriers of the wireless access network node that supports carrier aggregation. A remainder of the multiple wireless connections is (are) established with at least one other wireless access network node. For example, concurrent uplink transmissions over wireless connections with multiple wireless access network nodes can include multiple uplink transmissions over wireless connections with different component carriers (cells) of a first wireless access network node, and an uplink transmission over a wireless connection with a second wireless access network node.

The prioritization rule specifying priorities of the uplink transmissions can specify priorities of uplink transmissions over wireless connections provided over different component carriers as well as with multiple wireless access network nodes.

In the ensuing discussion, reference is made to mobile communications networks that operate according to the Long-Term Evolution (E-UTRA) standards as provided by the Third Generation Partnership Project (3GPP). The E-UTRA standards are also referred to as the Evolved Universal Terrestrial Radio Access (E-UTRA) standards.

Although reference is made to E-UTRA in the ensuing discussion, it is noted that techniques or mechanisms according to some implementations can be applied to other wireless access technologies.

In an E-UTRA network, a wireless access network node can be implemented as an enhanced Node B (eNB), which includes functionalities of a base station and base station controller. Thus, in an E-UTRA network, a macro wireless access network node is referred to as a macro eNB. In an E-UTRA network, small cell wireless access network nodes can be referred to as small cell eNBs.

In an E-UTRA network, the control node 120 in the core network 118 can be implemented as a mobility management entity (MME). An MME is a control node for performing various control tasks associated with an E-UTRA network. For example, the MME can perform idle mode UE tracking and paging, bearer activation and deactivation, selection of a serving gateway (discussed further below) when the UE initially attaches to the E-UTRA network, handover of the UE between macro eNBs, authentication of a user, generation and allocation of a temporary identity to a UE, and so forth. In other examples, the MME can perform other or alternative tasks.

In an E-UTRA network, the data gateway(s) 122 of the core network 118 can include a serving gateway (SGW) and a packet data network gateway (PDN-GW). The SGW routes and forwards traffic data packets of a UE served by the SGW. The SGW can also act as a mobility anchor for the user plane during handover procedures. The SGW provides connectivity between the UE and the PDN 124. The PDN-GW is the entry and egress point for data communicated between a UE in the E-UTRA network and a network element coupled to the PDN 124. There can be multiple PDNs and corresponding PDN-GWs. Moreover, there can be multiple MMEs and SGWs.

The eNBs that a UE connects to may use different configurations. In a first example, the UE may connect to a first eNB in a frequency division duplex (FDD) mode and a second eNB in a time division duplex (TDD) mode. In FDD mode, uplink and downlink transmissions are separated in the frequency domain, by transmitting uplink data using a first carrier frequency, and transmitting downlink data using a second carrier frequency. In TDD mode, both uplink and downlink transmissions occur on the same carrier frequency; however, uplink and downlink transmissions are separated in the time domain, by sending uplink and downlink transmissions in different time periods.

In another example, the UE may connect to multiple eNBs in TDD mode; however, the connections to the multiple eNBs may employ different TDD uplink-downlink configurations. In TDD mode, one of several different uplink-downlink configurations may be used for communications between a UE and an eNB. A particular uplink-downlink configuration can specify that, within a frame, a first subset of subframes in the frame is used for uplink transmissions, and a second subset of subframes in the frame is used for downlink transmissions. Different uplink-downlink configurations can employ different numbers of uplink and downlink subframes. A subframe refers to a segment of an overall frame that is used for carrying data and control information, where the segment has a specified time length.

In another example, at least one eNB may deploy carrier aggregation, such that the eNB provides multiple serving cells corresponding to the multiple component carriers of the carrier aggregation. The different serving cells have use TDD uplink-downlink configurations.

In the various examples above as well as in other examples, the uplink transmit power of a UE is shared between all concurrent uplink transmissions. Some dual-connection examples (where the UE is concurrently connected to eNB1 and eNB2) are provided below:

Both eNB1 and eNB2 operate in the FDD mode. In this scenario, the uplink transmit power sharing is applied to all uplink subframes that the UE simultaneously transmit to eNB1 and eNB2. For full duplex communications (where uplink and downlink transmissions can simultaneously occur), the uplink transmit power sharing applies to all scheduled uplink subframes. For half duplex communications (where uplink and downlink transmissions occur at different times), the uplink transmit power sharing applies to the subframes dedicated to uplink transmission (instead of downlink transmissions).

eNB1 operates in the FDD mode, and eNB2 operates in the TDD mode. During times when the UE is transmitting uplink subframes to eNB2, the uplink transmit power sharing control is applied to the concurrent uplink subframes sent to both eNB1 and eNB2. During times when the UE is transmitting uplink subframes to only eNB1, all of the uplink power is available for the wireless connection(s) with eNB1.

Both eNB1 and eNB2 operate in the TDD mode, but the uplink-downlink configurations of eNB1 and eNB2 are different. During times when the UE is sending uplink subframes to both eNB1 and eNB2, the uplink transmit power sharing control is applied across the two eNBs. However, during times when the UE is sending uplink subframes to just one of the two eNBs, all of the uplink power is available for the wireless connection(s) with the one eNB.

There are various example total uplink transmit power thresholds that may be exceeded by multiple concurrent uplink transmissions by a UE over respective wireless connections involving two or more eNBs. An example total uplink transmit power threshold is $P_{PowerClass}$, which is a maximum uplink transmit power threshold specified by an eNB for a given UE power class. Another example total uplink transmit power threshold is $\hat{P}_{CMAX}$, which can be configured by a UE.

The following describes various solutions that can be applied. Some of the solutions are applicable in cases where a UE's uplink timings to multiple eNBs are aligned. More specifically, the boundaries of uplink subframes communicated by the UE to the eNBs are time aligned from the UE's perspective. Time alignment of subframes (from the UE's perspective) can occur when the eNBs are time synchronized with each other, and the distances between the UE and the eNBs are approximately the same.

Other solutions described above are applicable to cases where a UE's uplink timings to multiple eNBs are not aligned. For example, the uplink subframes from the UE to the multiple eNBs may not have their subframe boundaries aligned from the UE's perspective. Misalignment can occur when the eNBs are not time synchronized with each other. Even in cases where the eNBs are time synchronized, the uplink subframes to the eNBs may not be aligned due to substantially different distances from the eNBs to the UE (which results in different timing advances for the UE's communications with the respective eNBs).

Furthermore, an eNB that the UE is connected to can further be configured with carrier aggregation. The serving cells provided by the component carriers of the eNB can belong to different timing advance groups. Different timing advances are applied in the different timing advance groups due to the different propagation delays for communications of the UE with the different serving cells. The different propagation delays in the different serving cells means that the uplink subframes of the UE sent in the different serving cells would be timing misaligned.

Solution 1

Solution 1 is applicable to cases where a UE has concurrent uplink transmissions of certain control and traffic channels, such as a physical uplink control channel (PUCCH) and a physical uplink shared channel (PUSCH). Solution 1 can be applied for cases where the uplink timings to different serving eNBs are aligned.

A PUCCH is used to carry certain types of uplink control information (UCI). UCI includes as examples, a scheduling request (SR), an Ack/Nack (acknowledgement or negative acknowledgment) of receipt of downlink data, a channel state information (CSI) for indicating a channel condition, such as modulation level and coding rate, rank and precoding matrix indications in case of multiple transmit antennas deployment at an eNB, as observed by the UE, and so forth. UCI can be carried by PUCCH or PUSCH.

A PUSCH is used to carry traffic data. In addition, uplink control information (UCI) can also be embedded in the PUSCH. The UCI can include the same control signaling as carried in a PUCCH. Note that a PUSCH can be sent with or without UCI.

In the ensuing discussion, it is assumed that the UE has PUCCH transmission(s) on a set of one or more serving cells J, PUSCH transmission(s) with UCI on a set of one or more serving cells K, and PUSCH transmission(s) without UCI on one or more other serving cells C. A "serving cell" can refer to a cell provided by a single-carrier eNB, or a cell provided by a component carrier from among multiple component carriers of a carrier aggregation provided by an eNB. In other examples, other combinations of uplink transmissions can be made by the UE.

In the foregoing scenario, if the total (aggregate) transmit power of the UE is detected to exceed a threshold, such as $\hat{P}_{CMAX}(i)$, the UE may prioritize the uplink transmissions in the following order, where (1) indicates a highest priority level, and (5) indicates a lowest priority level:
 (1) PUCCH transmission with Ack/Nack (with or without CSI, e.g. PUCCH format 1a, 1b, 2a, 2b, or 3);
 (2) PUSCH transmission with Ack/Nack (with or without CSI);
 (3) PUSCH transmission with CSI only, without Ack/Nack;
 (4) PUCCH transmission with CSI only, without Ack/Nack (e.g. PUCCH format 2);
 (5) PUSCH transmission without UCI.

The foregoing provides an example of a prioritization rule. Although a specific number of different types of uplink transmissions with respective different priority levels are listed above, there can be different numbers of different types of uplink transmissions with corresponding priority levels in other examples.

According to the foregoing prioritization rule, a PUCCH or a PUSCH that carries acknowledgement information (e.g. ACK/NACK) is assigned a higher priority because a loss of the acknowledgement information would cause either PUSCH retransmission of downlink packets, or downlink packet loss if the maximum number of retransmissions has been reached.

Periodic CSI reports are carried on a PUCCH, and aperiodic CSI reports are carried on a PUSCH. Aperiodic CSI reporting is considered to be more important than periodic CSI information, and thus a PUSCH carrying CSI (but no Ack/Nack) is assigned a higher priority than a PUCCH carrying CSI (but no Ack/Nack). A PUSCH without any UCI is assigned a lowest priority.

If there is a group of multiple uplink transmissions from the UE to respective serving cells within each priority level, then one of two different power sharing techniques can be applied to this group of uplink transmissions. With a first technique, equal power scaling can be applied, where the same factor is applied to each uplink transmission of the group. With a second technique, cell-dependent power scaling can be applied, where factors applied to the uplink transmissions of the group depend on the respective serving cells. For example, a first factor can be applied to an uplink transmission of the group to a first serving cell, while a second factor can be applied to an uplink transmission of the group to a second serving cell. For example, a first uplink transmission of the group to the first serving cell can include a PUSCH carrying delay-sensitive traffic data (e.g. voice-over-Internet Protocol traffic data), while a second uplink transmission of the group to the second serving cell can include a PUSCH carrying delay-insensitive traffic data (e.g. web browsing traffic). In this case, the cell-dependent power scaling applies a greater factor to the first uplink transmission than a factor applied to the second uplink transmission. For example, let $P_1$ and $P_2$ be respectively the desired transmit power of the first uplink transmission and the desired transmit power of the second uplink transmission, and $w_1 P_1$ and $w_2 P_2$ be respectively the actual transmit power of the first uplink transmission and the actual transmit power of the second uplink transmission after scaling, then the factor $w_1$ is greater than the factor $w_2$.

Alternatively, instead of or in addition to defining priority levels for different types of uplink transmissions as discussed above, prioritization can be based on eNBs to which the uplink transmissions are sent. For example, uplink transmission(s) to a first eNB may be assigned a higher priority than uplink transmission(s) to a second, different eNB.

For the following discussions, it is assumed that the UE may have the following concurrent uplink transmissions in subframe i:
 PUCCH transmission(s) with Ack/Nack on a set of one or more serving cells $J_1 \subseteq J$;
 PUCCH transmission(s) without Ack/Nack on one or more serving cells $J_2=J-J_1$;
 PUSCH transmission(s) with UCI containing Ack/Nack on a set of one or more serving cells $K_1 \subseteq K$;
 PUSCH transmission(s) with UCI not containing Ack/Nack on a set of one or more serving cells $K_2=K-K_1$;
 PUSCH transmission(s) without UCI on a set of one or more serving cells C.

Acknowledgement information that can be carried in a PUCCH transmission or PUSCH transmission includes Ack for positively acknowledging receipt of a downlink subframe, or a Nack to negatively acknowledge receipt of a downlink subframe (in other words, Nack indicates to the eNB that the downlink subframe sent by the eNB was not successfully received by the UE). Note that in the figures, for simplicity, PUSCH carrying uplink control information other than Ack/Nack is labeled as "PUSCH with CSI UCI", which may include SR or other uplink control information.

In accordance with some implementations, Solution 1 causes the power of uplink transmissions with lower priority to be adjusted (by either reducing the power of the lower priority uplink transmission or dropping the uplink transmission altogether), to bring the total uplink transmission power within a specified threshold. Adjusting the power of lower priority uplink transmissions protects higher priority uplink transmissions, to ensure that higher priority uplink transmissions can be successfully received by the network.

Figure 3:
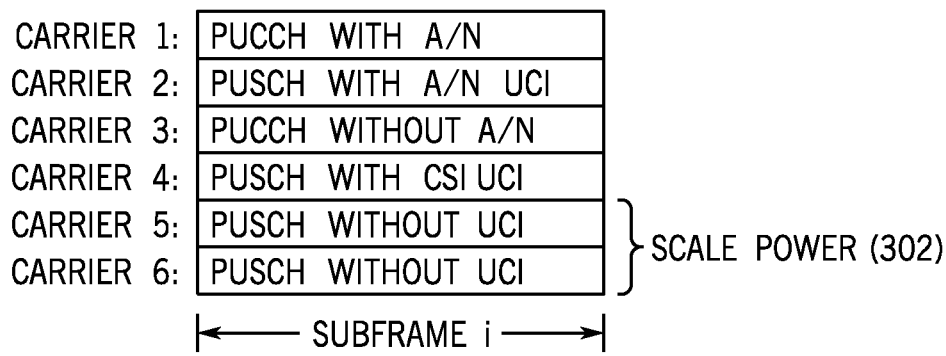
FIGS. 3-15 are schematic diagrams of applying uplink transmit power sharing control to concurrent uplink transmissions from a UE, according to various implementations.

FIG. 3 shows an example in which multiple carriers (1-6) are used for carrying respective uplink transmissions. It is assumed that the uplink transmissions are concurrent transmissions in subframe i. Carriers 1-6 can be carriers associated with different eNBs. In some examples, two or more of the carriers can be component carriers of a carrier aggregation provided by one eNB. Thus, the six carriers depicted in the example of FIG. 3 can be provided by two or more eNBs.

In a first scenario, if the total uplink power of the UE would exceed $\hat{P}_{CMAX}(i)$, the UE scales down (at 302) the power $\hat{P}_{PUSCH,c}(i)$ for a serving cell $c \in C$ in subframe i such that the condition $$\sum_{c \in C} w_c(i) \cdot P_{PUSCH,c}(i) \leq \left( \hat{P}_{CMAX}(i) - \sum_{j \in J} \hat{P}_{PUCCH,j}(i) - \sum_{k \in K} \hat{P}_{PUSCH,k}(i) \right)$$

is satisfied, where $\hat{P}_{PUSCH,c}(i)$ is the linear value of the target transmit power $\hat{P}_{PUSCH,c}(i)$ for serving cell $c \in C$ (power of PUSCH without UCI), $\hat{P}_{PUCCH,j}(i)$ is the linear value of the target transmit power $\hat{P}_{PUCCH,j}(i)$ for serving cell $j \in J$ (power of PUCCH), $\hat{P}_{PUSCH,k}(i)$ is the linear value of the target transmit power $P_{PUSCH,k}(i)$ for serving cell $k \in K$ (power of PUSCH carrying UCI), and $0 \leq w_c(i) \leq 1$ is a power scaling factor of $\hat{P}_{PUSCH,c}(i)$ for serving cell $c \in C$.

As depicted in FIG. 3, the power scaling (at 302) causes a reduction of the power of the PUSCH transmissions on carriers 5 and 6 (these are the uplink transmissions that do not carry UCI).

In some examples, the parameter $w_c(i)$ can be independent of serving cell c. In this case, the remaining power (power remaining after uplink transmissions of PUCCH(s) and PUSCH(s) carrying UCI) is equally divided among the PUSCH transmissions that do not carry UCI. Alternatively, the parameter $w_c(i)$ can be based on factors such as the path loss to the serving cell c. For example, the PUSCH transmission to a close-in eNB may be assigned a higher priority. As another example, $w_c(i)$ can be based on a quality-of-service (QoS) configuration associated with each PUSCH. For example, delay-sensitive traffic may be prioritized over delay-insensitive traffic, or an uplink retransmission may be prioritized over a new uplink transmission.

The foregoing provides a solution to address the first scenario where the total uplink power of all of the uplink transmissions of the UE would exceed $\hat{P}_{CMAX}(i)$.

A second scenario applies where $$\left(\hat{P}_{CMAX}(i) - \sum_{j \in J} \hat{P}_{PUCCH,j}(i) - \sum_{k \in K} \hat{P}_{PUSCH,k}(i)\right) < 0.$$

Figure 4:
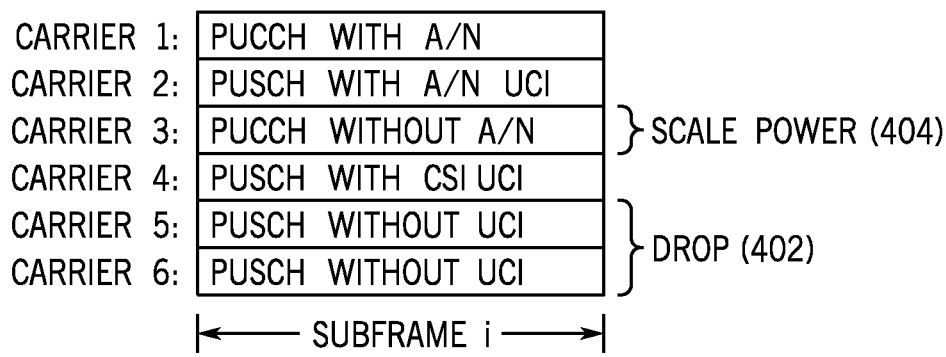

In this second scenario, just the uplink transmissions of PUCCH and PUSCH with UCI would cause the power threshold to be exceeded; in other words, even if the UE does not transmit any PUSCH without UCI, the power threshold would still be exceeded by the remaining uplink transmissions. In this second scenario, as shown in FIG. 4, the UE drops (at 402) PUSCH transmission without UCI, which in FIG. 4 are provided on carriers 5 and 6. In addition, the UE scales down (at 404) $\hat{P}_{PUCCH,j}(i)$ without Ack/Nack for the serving cells $J_2$ in subframe i such that the condition $$\sum_{j \in J_2} v_j(i) \cdot \hat{P}_{PUCCH,j}(i) \le \left(\hat{P}_{CMAX}(i) - \sum_{j \in J_1} \hat{P}_{PUCCH,j}(i) - \sum_{k \in K} \hat{P}_{PUSCH,k}(i)\right)$$

is satisfied, where $0 \le v_j(i) \le 1$ is a scaling factor of $\hat{P}_{PUCCH,j}(i)$ for serving cell $j \in J_2$.

In a third scenario, the total uplink power of the PUCCH(s) carrying acknowledgement information (Ack/Nack) and the PUSCH(s) carrying UCI would exceed the power threshold, as expressed by $$\left(\hat{P}_{CMAX}(i) - \sum_{j \in J_1} \hat{P}_{PUCCH,j}(i) - \sum_{k \in K} \hat{P}_{PUSCH,k}(i)\right) < 0.$$

Figure 5:
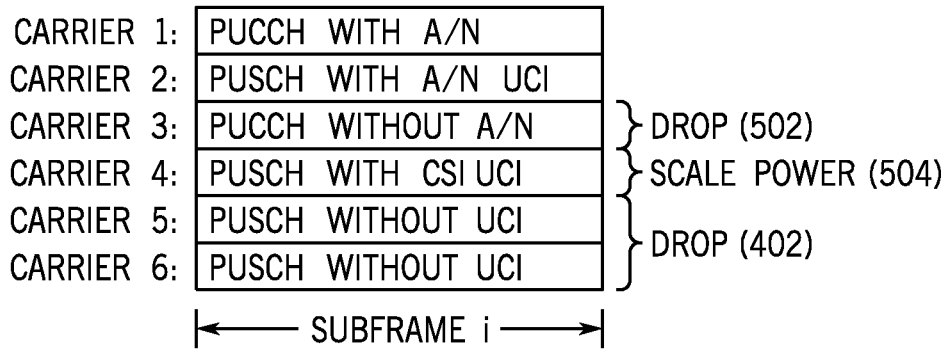

In this third scenario, as shown in FIG. 5, the following uplink transmissions are dropped (at 402, 502): the PUSCH transmissions without UCI on carriers 5 and 6, and the PUCCH transmission without Ack/Nack on carrier 3. The UE scales down (at 504) the PUSCH transmission(s) with CSI but without Ack/Nack on serving cell(s) $K_2$ in subframe i such that the condition $$\sum_{k \in K_2} u_k(i) \cdot \hat{P}_{PUSCH,k}(i) \le \left(\hat{P}_{CMAX}(i) - \sum_{j \in J_1} \hat{P}_{PUCCH,j}(i) - \sum_{k \in K_1} \hat{P}_{PUSCH,k}(i)\right)$$

is satisfied, where $0 \le u_k(i) \le 1$ is a scaling factor of $\hat{P}_{PUSCH,k}(i)$ for serving cell $k \in K_2$.

In a fourth scenario, the total transmission power of PUCCH with Ack/Nack and PUSCH with Ack/Nack would exceed the power threshold, as expressed by $$\left(\hat{P}_{CMAX}(i) - \sum_{j \in J_1} \hat{P}_{PUCCH,j}(i) - \sum_{k \in K_1} \hat{P}_{PUSCH,k}(i)\right) < 0.$$

Figure 6:
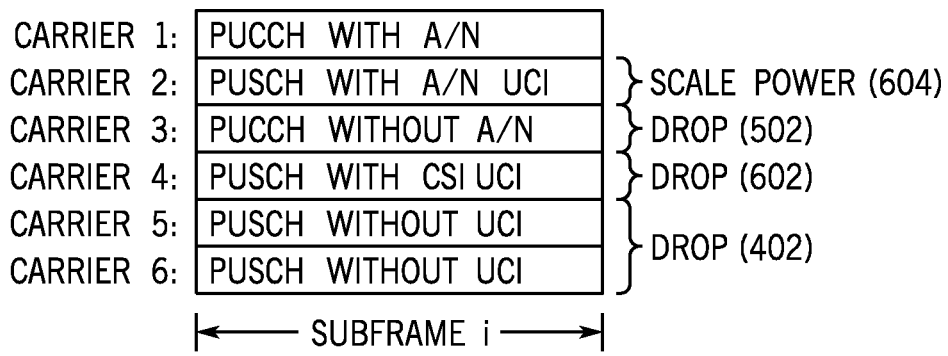

In this case, as shown in FIG. 6, the following uplink transmissions are dropped (at 402, 502, 602): the PUSCH transmissions without UCI on carriers 5 and 6, the PUCCH transmission without Ack/Nack on carrier 3, the PUSCH transmission without Ack/Nack on serving cell $K_2$ (carrier 4). The PUSCH transmission with Ack/Nack on serving cell $K_1$ can be scaled down (at 604) such that the condition $$\sum_{k \in K_1} \eta_k(i) \cdot \hat{P}_{PUSCH,k}(i) \le \left(\hat{P}_{CMAX}(i) - \sum_{j \in J_1} \hat{P}_{PUCCH,j}(i)\right)$$

is satisfied, where $0 \le \eta_k(i) \le 1$ is a scaling factor of $\hat{P}_{PUSCH,k}(i)$ for serving cell $k \in K_1$. If better protection of channels carrying Ack/Nack is desired, the scaling (at 604) of PUSCH carrying Ack/Nack can be modified so that it is only applied to resource elements (REs) carrying data payload. The REs for Ack/Nack in the PUSCH are not power scaled. An RE refers to an element of a wireless transmission for carrying certain information. In some examples, an RE can be a modulation symbol, such as an orthogonal frequency-division multiplexing (OFDM) symbol. More generally, the power scaling (at 604) can be according to a prioritization rule specifying that a first RE associated with acknowledgement information contained in an uplink traffic channel transmission has a higher priority than a second RE associated with traffic data contained in the same uplink traffic channel transmission.

In a fifth scenario, just the uplink transmission of PUCCH carrying Ack/Nack would cause the power threshold to be exceeded, as expressed by $$\left(\hat{P}_{CMAX}(i) - \sum_{j \in J_1} \hat{P}_{PUCCH,j}(i)\right) < 0.$$

Figure 7:
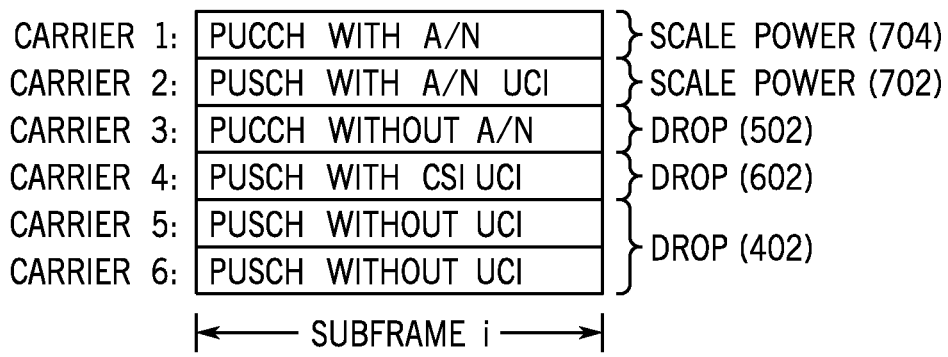

In this fifth scenario, in addition to dropping (at 402, 502, 602) various uplink transmissions as discussed above, FIG. 7 also shows that the UE scales down (at 702) the PUSCH carrying Ack/Nack, and scales down (at 704) the PUCCH carrying Ack/Nack. The power scaling (at 702) of the PUSCH carrying Ack/Nack is performed differently from the power scaling (at 604) shown in FIG. 6. In FIG. 7, the scaling of power involves the UE setting the power of data REs of the $PUSCH_k$ ($k \in K_1$) equal to zero. The scaling (at 702, 704) $\hat{P}_{PUCCH,j}(i)$ for $j \in J_1$ and $\hat{P}_{PUSCH,k}(i)$ for $k \in K_1$ in subframe i is performed such that the condition $$\sum_{j \in J_1} \lambda_j(i) \cdot \hat{P}_{PUCCH,j}(i) + \sum_{k \in K_1} \gamma_k(i) \cdot \hat{P}_{PUSCH,k}(i) \le \hat{P}_{CMAX}(i)$$

is satisfied, where $0 \leq \lambda_j(i) \leq 1$ is a scaling factor of $\hat{P}_{PUCCH,j}(i)$ and $0 \leq \gamma_k(i) \leq 1$ is a scaling factor of $\hat{P}_{PUSCH,k}(i)$ which is applied to Ack/Nack REs only. The power at data REs of the PUSCH carrying Ack/Nack is set to zero, i.e. only Ack/Nack REs are transmitted in the PUSCH transmission.

Solution 2

Solution 1 discussed above refers to a solution that can be applied where a UE transmits PUCCH(s) and PUSCH(s), but not a sounding reference signal (SRS). However, Solution 2 is applied in cases where SRS is sent by a UE. The SRS is measured by an eNB to determine uplink channel quality, to determine a timing advance, and for other purposes.

Solution 2 is also applicable in cases where the UE uplink timings to different serving eNBs are aligned.

Figure 8:
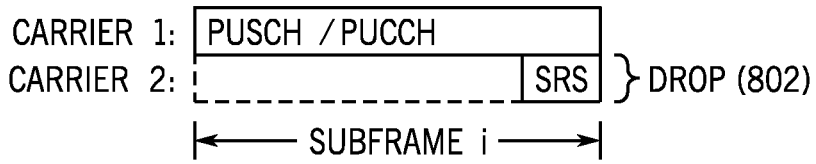

When PUSCH/PUCCH is transmitted to a first eNB while SRS is transmitted to a second eNB by a UE in the same subframe i (as shown in FIG. 8), the following options can be used by the UE, in some implementations.

In FIG. 8, it is assumed that PUSCH/PUCCH (PUSCH or PUCCH or both) is carried on carrier 1, while SRS is carried on carrier 2, both in the same subframe i. Carriers 1 and 2 are provided by different eNBs. In a first option (Option 1), SRS is dropped (at 802) if there is a PUSCH/PUCCH transmission on any component carrier and on any connection in subframe i of regardless of whether there is a UE power constrained condition or not. A UE power constrained condition is present if the total uplink power (of various uplink transmissions of the UE) exceeds a power threshold.

In a second option (Option 2), SRS is transmitted if there is no power constrained condition, and scaled if there is a power constrained condition. Effectively, the prioritization rule for Option 2 specifies that a PUSCH/PUCCH transmission has a higher priority than an SRS transmission.

In a third option (Option 3), the PUSCH can be rate matched or a shortened PUCCH can be used for each subframe that carries an SRS that is configured for any component carrier or any wireless connection. An SRS that is configured for any component carrier or any wireless connection of a UE refers to an SRS that can be sent by the UE in a given serving cell, where this SRS is useable by the network to determine the channel condition, timing advance, and so forth, for all serving cells for the UE.

Figure 9:
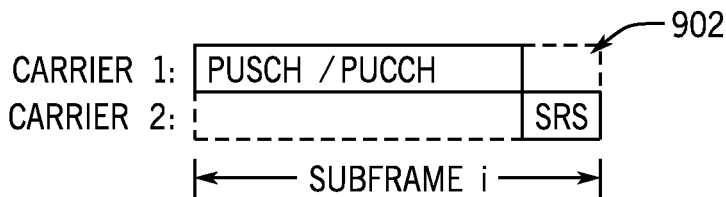

An example is depicted in FIG. 9, where PUSCH/PUCCH is not transmitted in an orthogonal frequency-division multiplexing (OFDM) symbol or other portion of subframe i that is configured for carrying SRS. In the example of FIG. 9, the last OFDM symbol (at 902) on carrier 1 is not used for transmitting PUSCH/PUCCH. The prioritization rule of Option 3 specifies that PUSCH/PUCCH is not transmitted in the portion that overlaps with an SRS transmission.

Using Option 1, an eNB can determine whether an SRS is dropped or not by a UE in a subframe if the eNB knows the scheduled PUCCH/PUSCH transmissions on other cells. However, when independent MAC schedulers are used in respective eNBs, it may be impractical for a first eNB to know the PUCCH/PUSCH scheduling of a second eNB. Thus, the first eNB expecting an SRS from the UE may have to blindly detect if the SRS was dropped or not. In addition, if there are more than two cells and many PUCCH/PUSCH transmissions on other cells, the likelihood of dropping SRS using Option 1 is increased.

Using Option 2, an SRS is transmitted if there is no power constrained condition, and power scaled down if there is a power constrained condition. Power scaling down an SRS transmission power may cause pessimistic uplink CSI estimation and thus lower uplink data rate. Pessimistic uplink CSI estimation refers to the eNB making a determination that a channel condition is worse than it actually is. However, the lower data rate may be temporary and also depends on the amount of power scaling. In addition, the timing advance estimation can continue.

Using Option 3, PUSCH transmission to a UE with multiple wireless connections is rate matched or PUCCH transmission is shortened in each subframe carrying an SRS; the PUSCH rate matching or PUCCH shortening is performed in all serving cells of the UE. Since periodic and aperiodic subframes carrying SRS are semi-statically configured for a UE, such configuration can be exchanged among eNBs serving the UE. This can allow a deterministic behavior of SRS transmission at the UE and SRS reception at the eNBs.

Solution 3

Solution 2 addresses cases where an SRS transmitted by a UE to one eNB is applicable to all component carriers or wireless connections. In different cases, multiple SRS transmissions can be sent by the UE to different eNBs. Solution 3 can be applied in such cases. As with Solution 2, Solution 3 is applicable where the UE uplink timings to different serving eNBs are aligned.

Solution 3 is triggered in response to the UE detecting that the total uplink power of the UE for SRS transmissions would exceed $\hat{P}_{CMAX}(i)$. In response to such detection, the UE scales $\hat{P}_{SRS,c}(i)$ for a serving cell c in subframe i such that the condition $$\sum_c w(i) \cdot \hat{P}_{SRS,c}(i) \leq \hat{P}_{CMAX}(i)$$

is satisfied, where $\hat{P}_{SRS,c}(i)$ is the linear value of $\hat{P}_{SRS,c}(i)$, $\hat{P}_{SRS,c}(i)$ is the UE transmit power for the SRS transmitted on subframe i for serving cell c, and w(i) is a scaling factor of $P_{SRS,c}(i)$ for serving cell c where $0 < w(i) \leq 1$. Note that w(i) values can be the same across serving cells.

Figure 10:
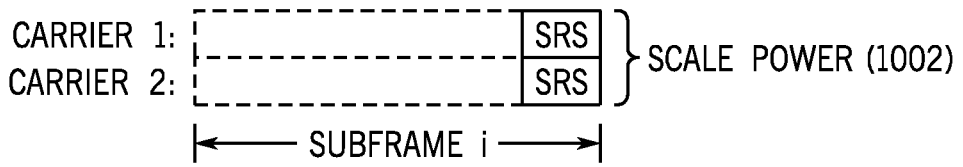

An example of the scaling of power of SRS transmissions is shown in FIG. 10, which shows multiple SRS transmissions on different carriers 1 and 2 (of different eNBs) in subframe i. The scaling of power of the SRS transmissions is represented as 1002. The prioritization rule for the scenario represented by FIG. 10 specifies that multiple SRS transmissions to multiple eNBs are power scaled when a total uplink power of the UE exceeds the power threshold.

In some implementations, the power sharing control based on power scaling of SRS transmissions among two or more eNBs described above is complementary to the power sharing control among serving cells for carrier aggregation of a particular eNB. Each of one or more eNBs can have multiple serving cells provided by respective component carriers of the carrier aggregation. A challenge posed by the UE being served by multiple eNBs is that the SRS pattern (e.g. time window(s) or frequency(ies) on which SRS transmissions may be made) of a first eNB may not be known to a second eNB. For periodic SRS (SRS sent on a periodic basis), the pattern can be shared between eNBs, so that all serving eNBs can derive the power level to expect for the SRS. For aperiodic SRS, such information exchange may not be feasible.

An example solution to avoid unknown SRS power scaling is for each eNB to define an SRS pattern for all possible SRS transmissions for a given UE, and exchange the SRS pattern among the eNBs. For example, a first eNB can only schedule SRS transmissions within a first SRS pattern, which specifies that SRS transmissions can occur in first subframe(s), and not in other subframe(s). The SRS pattern can also specify the frequency or frequencies on which an SRS transmission is made. Similarly, a second eNB can only schedule SRS transmission within a second SRS pattern, which specifies that SRS transmissions can occur in second subframe(s), and not in other subframe(s). The first and second SRS patterns may or may not overlap.

Whenever an SRS transmission of the first eNB overlaps with the second SRS pattern, the UE scales the power of the SRS transmission of the first eNB as if there is concurrently an SRS transmission to the second eNB (even though there may not be an actual SRS transmission to the second eNB in that subframe).

Solution 4

Solution 4 is also applicable in cases where the UE uplink timings to different serving eNBs are aligned.

Solution 4 is applied in cases where concurrent physical random access channel (PRACH) and PUSCH/PUCCH transmissions are made in the same subframe, but to different eNBs. PRACH is used by a UE to perform a random access procedure of an eNB to access the eNB such that the UE can establish a communications session.

Figure 11:
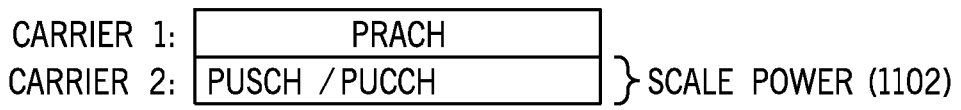

An example of concurrent PRACH and PUSCH/PUCCH transmissions is illustrated in FIG. 11, where carrier 1 carries PRACH, while carrier 2 carries PUSCH/PUCCH. Carriers 1 and 2 are provided by different eNBs. In such cases, the UE can adjust (at 1102) the transmission power of PUSCH/PUCCH so that the total uplink power of the UE does not exceed $P_{CMAX}$. Effectively, according to FIG. 11, a PRACH transmission is assigned a higher priority than a PUSCH/PUCCH transmission.

Solution 5

Solution 5 is also applicable in cases where the UE uplink timings to different serving eNBs are aligned.

Figure 12:
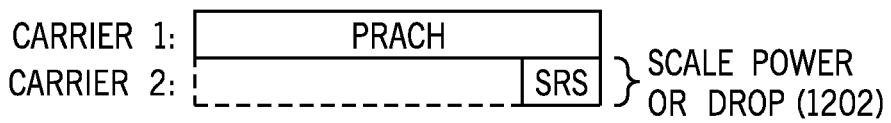

Solution 5 can be applied where there are concurrent PRACH and SRS transmissions to different eNBs (over carriers 1 and 2 as shown in FIG. 12) in the same subframe. The PRACH transmission is assigned a higher priority than the SRS transmission. As shown in FIG. 12, the UE power scales or drops (at 1202) the SRS transmission if the total uplink power exceeds a power threshold in a subframe.

In cases where the SRS transmission is dropped, the eNB expecting an SRS transmission may have to blindly estimate whether or not the SRS transmission was dropped by the UE by measuring the power level over the REs of the subframe that are expected to carry the SRS transmission. If the measured power level is below a certain threshold, the eNB expecting the SRS transmission can assume that the SRS transmission was dropped by the eNB as part of the uplink power sharing control.

In cases where the SRS transmission is power scaled, the SRS transmission is still transmitted but with a scaled down transmit power. The eNB would not have to perform any SRS drop detection. In this case, the uplink CSI may be estimated pessimistically, resulting in a reduced uplink data rate. Unlike in the dropping case, the timing advance estimation can continue.

Solution 6

Solution 6 is applicable when serving eNBs of a UE are not time synchronized or their distances to the UE differ by a large amount (a difference in distance greater than a specified threshold). As a result, the timing of uplink transmissions at the UE to the eNBs may not be aligned. The misalignment can be by more than a specified amount, such as more than one OFDM symbol in length.

Figure 13A:
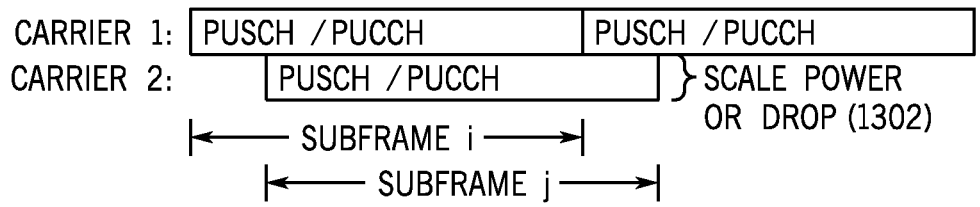
Figure 13B:
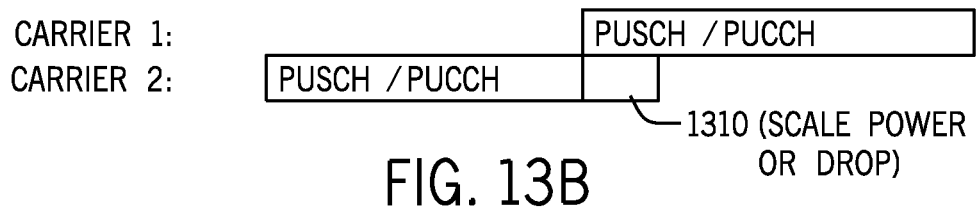

The misalignment of uplink transmissions of the UE to different eNBs is shown in two example scenarios in FIGS. 13A and 13B, where carriers 1 and 2 are provided by the different eNBs. In FIG. 13A, the UE transmits a PUSCH/PUCCH in subframe i to a first eNB, and transmits a PUSCH/PUCCH in subframe j to a second eNB, where subframes i and j overlap by some amount. When the UE is scheduled to transmit PUCCH/PUSCH to more than one eNB, and the transmissions overlap in time, the UE power scales or drops (at 1302) the PUCCH/PUSCH transmission on one of the carriers (carrier 2 in the example of FIG. 13A) if the total uplink power exceeds a power threshold.

In some implementations, the following prioritization rule can be applied. If a PUSCH/PUCCH transmission with a higher priority is transmitted earlier than a PUSCH/PUCCH transmission with a lower priority, and the total uplink power of the UE exceeds a power threshold in the overlap time period, the lower priority PUSCH/PUCCH transmission is power scaled or dropped across the whole subframe of the lower priority PUSCH/PUCCH (subframe j in FIG. 13A). In other words, the power adjustment is performed over a full transmission time period (corresponding to the length of an entire subframe).

The prioritization rule can specify a different action under a different scenario, as shown in FIG. 13B. If the PUSCH/PUCCH transmission of a lower priority (on carrier 2 in the FIG. 13B example) is transmitted earlier than the PUSCH/PUCCH transmission of a higher priority, and the total uplink power of the UE exceeds the power threshold in the overlap time period, the lower priority PUSCH/PUCCH transmission in the overlap region (1310 in FIG. 13B) is either power scaled or dropped. In other words, the power adjustment in this latter case is performed over a part of the full transmission time period, where the part is the overlapping time region.

Figure 14:
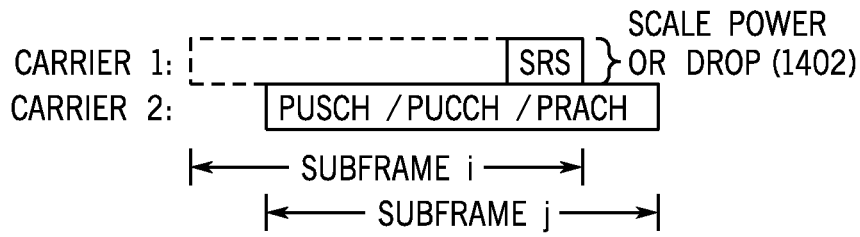

In a different scenario, as shown in FIG. 14, a UE is scheduled to transmit PUSCH/PUCCH/PRACH (PUSCH or PUCCH or PRACH) in subframe i and SRS in subframe j to multiple respective eNBs, and such uplink transmissions overlap in time (as shown in FIG. 14), the UE scales or drops (at 1402) the SRS transmission if the total uplink power exceeds the power threshold.

If the SRS transmission is dropped when it overlaps with a PUSCH/PUCCH/PRACH transmission, an eNB is made aware of the SRS transmission being dropped by the UE so that incorrect uplink channel interpretation can be avoided, and the eNB does not have to perform blind detection to decide whether the SRS was transmitted or not.

If the SRS transmission is power scaled, and there is a power constrained condition (the total uplink power of the UE exceeds the power threshold), an eNB can perform pessimistic uplink CSI estimation, which can result in a reduced uplink data rate. However, the lower data rate may be temporary and also depends on the amount of power scaling. In addition, timing advance estimation can continue.

In alternative implementations, a different technique of addressing the FIG. 14 scenario is to define a pattern for SRS transmission (such as in the time-frequency domain), and to allow eNBs to notify each other of such SRS patterns. An SRS pattern can specify the time window(s) and frequency(ies) on which an SRS may be transmitted. An SRS transmitted within a specified SRS pattern is protected, such that the SRS would not be dropped. An SRS transmitted outside of the SRS pattern may be dropped if the SRS overlaps with PUSCH/PUCCH/PRACH.

Figure 15:
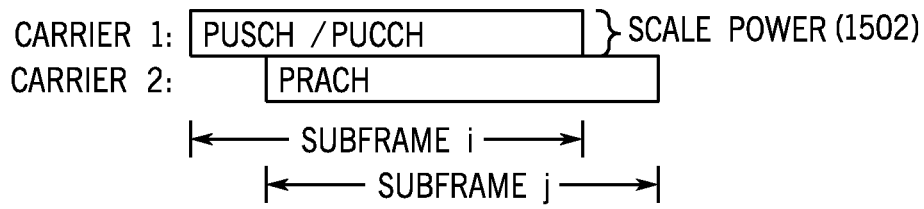

When a UE is scheduled to transmit PRACH and PUSCH/PUCCH to multiple respective eNBs (e.g. in subframe i and subframe j, respectively, over carriers 1 and 2 in FIG. 15), and the transmissions overlap in time (as shown in FIG. 15), the UE power scales (at 1502) the PUCCH/PUSCH transmission if the total uplink power exceeds the power threshold.

For simplicity, the discussion above (with respect to FIGS. 12-15) refer to eNBs that do not employ carrier aggregation. In general, at least one of the eNBs to which a UE has established concurrent wireless connections can be configured with carrier aggregation. Further, the primary cell (Pcell) and secondary cell(s) (Scell(s)) of a given eNB may have different timing advances to the UE; thus, the primary and secondary cells belong to different timing advance groups. When the UE is concurrently connected to two or more eNBs, several different uplink subframe timings are possible, for an individual eNB or across eNBs. When multiple eNBs are involved, the relative subframe timing between eNBs should be accounted for in grouping serving cells into timing advance groups. For example, the grouping can be performed by a macro eNB storing subframe/radio frame timing offset information between the macro eNB and affiliated small cell eNBs. Once the timing of different serving cells is specified from the perspective of UE, prioritization in an overlapping region (where concurrent uplink transmissions are made by the UE) can use any of the various solutions described above in response to the total uplink power of the UE exceeding a power threshold.

Solution 7

Control signaling can be defined for uplink power sharing control, where the control signaling is sent from an eNB to a UE. An example of the control signaling is Radio Resource Control (RRC) signaling, which is exchanged between RRC layers in the eNB and the UE. Generally, RRC signaling is used to broadcast system information to UEs, send a paging message to a UE, establish a radio connection with a UE, and so forth.

In accordance with some implementations, in an arrangement in which the UE has concurrent wireless connections with multiple eNBs, the RRC signaling can also be used to notify a UE which carrier (of a specific eNB) is to be used for reference signal received power (RSRP) measurement and pathloss calculation. The UE uses the RSRP measurement and pathloss calculation to calculate the UE's uplink transmit power. In cases where a UE sends uplink transmissions to multiple eNBs, the following options may be used for RRC signaling to the UE the carrier to be used for RSRP measurement and pathloss calculation.

An RSRP measurement measures the average received power over resource elements that carry cell-specific reference signals. Pathloss calculation refers to calculating a signal loss due to propagation of the signal over the downlink from the eNB to the UE.

In a first option (Option 1), there is no coordination among two or more eNBs to which the UE is concurrently connected. In some implementations, the eNBs (e.g. macro eNB and small cell eNB) can each perform its own RRC signaling formulation independently, and transmit corresponding power control RRC messages (identifying the carrier(s) to be used for RSRP measurement and pathloss calculation) to the UE independently. In such implementations, the UE receives power control messages from multiple eNBs, and the UE can perform power control for each of the eNBs based on the respective received uplink power sharing control messages.

In a second option (Option 2), there is coordination among two or more eNBs to which the UE is concurrently connected. In such cases, a power control RRC message is formulated in a first eNB (e.g. small cell eNB) identifying the carrier to be used for RSRP measurement and pathloss calculation. The power control RRC message is passed by the first eNB to a second eNB (e.g. macro eNB). The power control RRC message is then transmitted by the second eNB to the UE. This gives the second eNB an opportunity to modify the power control message formulated by the first eNB. The second eNB can be a central coordinator in such implementations.

System Architecture

Figure 16:
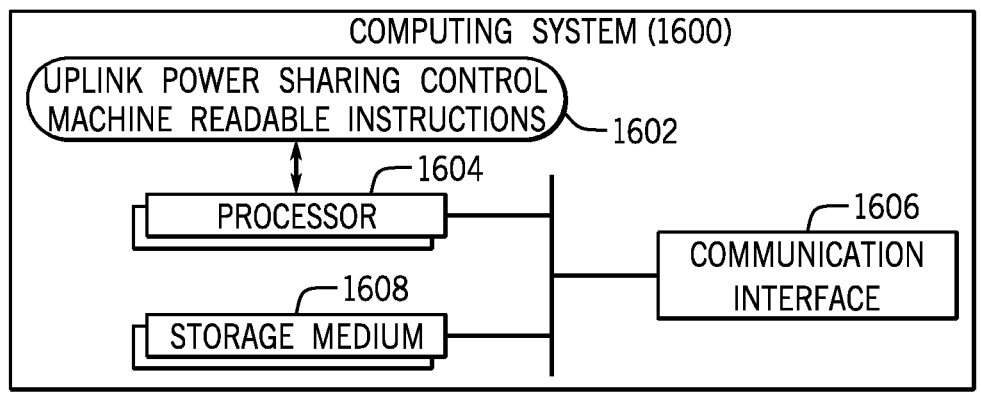
FIG. 16 is a block diagram of an example computing system that is able to incorporate some implementations.

FIG. 16 depicts a computing system 1600, which can be any of the UE 110, macro eNB 104, or small cell eNB 108 discussed above. The computing system 1600 includes uplink power sharing control machine-readable instructions 1602, which are executable on a processor (or multiple processors) 1604 to perform various tasks discussed above. A processor can include a microprocessor, microcontroller, processor module or subsystem, programmable integrated circuit, programmable gate array, or another control or computing device.

The processor(s) 1604 can be coupled to a communication interface (or communication component) 1606 to perform communications. For example, the communication interface 1606 can perform wireless communication over an air interface, or perform wired communication over a wired connection. In some cases, the computing system 1600 can include multiple communication interfaces 1606 to communicate with respective different network nodes.

The processor(s) 1604 can also be coupled to a computer-readable or machine-readable storage medium (or storage media) 1608, for storing data and instructions. The storage medium or storage media 1608 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
communicating, by a wireless access network node, wirelessly with a user equipment (UE);
using, by the wireless access network node, information relating to uplink power sharing control at the UE to process an uplink transmission from the UE, wherein the uplink transmission is one of a plurality of frequency-division multiplexing (FDM)-based uplink transmissions by the UE over corresponding wireless connections with respective wireless access network nodes, wherein the information relating to the uplink power sharing control includes a prioritization rule specifying:
- a higher priority of the one of the plurality of FDM-based uplink transmissions over a specified signal that is part of the plurality of FDM-based uplink transmissions,
- a first uplink transmission including acknowledgment information sent to a first wireless access network node has a higher priority than a second uplink transmission without acknowledgment information sent to a different second wireless access network node, the first and second uplink transmissions being part of the plurality of FDM-based uplink transmissions; and determining, by the wireless access network node, that transmission of the specified signal was dropped by the UE as a result of applying, by the UE, the uplink power sharing control according to the prioritization rule, the determining using, by the wireless access network node, the prioritization rule known to the wireless access network node.

2. The method of claim 1, wherein the plurality of FDM-based uplink transmissions are concurrent uplink transmissions that overlap fully or partially in time.

3. The method of claim 1, wherein the prioritization rule further specifies that a first uplink traffic channel transmission containing uplink control information has a higher priority than a second uplink traffic channel transmission without uplink control information.

4. The method of claim 1, wherein the prioritization rule further specifies that an uplink traffic channel transmission containing channel state information but without acknowledgment information has a higher priority than an uplink control channel transmission containing channel state information but without acknowledgement information.

5. The method of claim 1, wherein the prioritization rule further specifies that a random access channel transmission has a higher priority than an uplink control channel transmission or an uplink traffic channel transmission.

6. The method of claim 1, wherein the prioritization rule further specifies that a random access channel transmission has a higher priority than a sounding reference signal transmission.

7. The method of claim 1, wherein the plurality of FDM-based uplink transmissions to the respective wireless access network nodes are time aligned.

8. The method of claim 1, wherein the plurality of FDM-based uplink transmissions to the respective wireless access network nodes are time misaligned.

9. The method of claim 1, wherein the specified signal is a sounding reference signal, and the wireless access network node uses the prioritization rule in the information relating to the uplink power sharing control to determine that transmission of the sounding reference signal was dropped as a result of applying, by the UE, the uplink power sharing control according to the prioritization rule.

10. The method of claim 1, further comprising:
sending, by the wireless access network node to the UE, the prioritization rule.

11. A wireless access network node comprising:
a communication interface to communicate wirelessly with a user equipment (UE); and
at least one processor configured to:
use information relating to uplink power sharing control at the UE to process an uplink transmission from the UE, wherein the uplink transmission is one of a plurality of frequency-division multiplexing (FDM)-based uplink transmissions over corresponding wireless connections with respective wireless access network nodes, wherein the information relating to the uplink power sharing control includes a prioritization rule specifying a higher priority of the one of the plurality of FDM-based uplink transmissions over a sounding reference signal that is part of the plurality of FDM-based uplink transmissions; and
using the prioritization rule in the information relating to the uplink power sharing control, determine that transmission of the sounding reference signal was dropped due to the uplink power sharing control according to the prioritization rule performed at the UE, wherein the prioritization rule used by the wireless access network node is known to the wireless access network node and specifies that a first uplink transmission including acknowledgment information sent to a first wireless access network node has a higher priority than a second uplink transmission without acknowledgment information sent to a different second wireless access network node, the first and second uplink transmissions being part of the plurality of FDM-based uplink transmissions.

12. The wireless access network node of claim 11, wherein the plurality of FDM-based uplink transmissions are concurrent uplink transmissions that overlap fully or partially in time.

13. The wireless access network node of claim 11, wherein the plurality of FDM-based uplink transmissions to the respective wireless access network nodes are time aligned.

14. The wireless access network node of claim 11, wherein the plurality of FDM-based uplink transmissions to the respective wireless access network nodes are time misaligned.

* * * * *

UNITED STATES PATENT AND TRADEMARK OFFICE
CERTIFICATE OF CORRECTION

| | | |
|---|---|---|
| PATENT NO. | : 10,932,205 B2 | Page 1 of 1 |
| APPLICATION NO. | : 13/957620 | |
| DATED | : February 23, 2021 | |
| INVENTOR(S) | : Blankenship et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 966 days.

Signed and Sealed this
Seventh Day of February, 2023

Katherine Kelly Vidal
*Director of the United States Patent and Trademark Office*